US012459005B2

(12) United States Patent
Rosati

(10) Patent No.: US 12,459,005 B2
(45) Date of Patent: Nov. 4, 2025

(54) WASTE SORTING AND SEPARATION PROCESS FOR ABSORBENT ARTICLES

(71) Applicant: The Procter & Gamble Company, Cincinnati, OH (US)

(72) Inventor: Rodrigo Rosati, Frankfurt am Main (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/541,439

(22) Filed: Dec. 15, 2023

(65) Prior Publication Data

US 2024/0116082 A1 Apr. 11, 2024

Related U.S. Application Data

(63) Continuation of application No. PCT/US2022/036750, filed on Jul. 12, 2022.

(30) Foreign Application Priority Data

Jul. 12, 2021 (EP) .................................... 21185070

(51) Int. Cl.
*B07C 5/342* (2006.01)

(52) U.S. Cl.
CPC .... *B07C 5/3422* (2013.01); *B07C 2501/0054* (2013.01)

(58) Field of Classification Search
CPC .......... B07C 5/3422; B07C 2501/0054; B07C 5/3412; B07C 3/18
See application file for complete search history.

(56) References Cited

U.S. PATENT DOCUMENTS

| | | | | |
|---|---|---|---|---|
| 9,120,131 | B2 * | 9/2015 | Sundholm | B07C 3/06 |
| 2017/0225199 | A1 * | 8/2017 | Koistinen | B65F 1/0006 |
| 2020/0317896 | A1 | 10/2020 | Szala et al. | |
| 2021/0101719 | A1 * | 4/2021 | Morand | B65D 33/002 |

FOREIGN PATENT DOCUMENTS

| | | | |
|---|---|---|---|
| JP | H06312805 | A | 11/1994 |
| WO | 2016024043 | A1 | 2/2016 |

OTHER PUBLICATIONS

Extended EP Search Report and Search Opinion for 21185070.6 dated Dec. 9, 2021, 6 pages.
Extended EP Search Report and Search Opinion for 22184308.9 dated Jan. 16, 2023, 7 pages.
PCT Search Report and Written Opinion for PCT/US2022/036750 dated Nov. 3, 2022, 16 pages.

* cited by examiner

*Primary Examiner* — Jacob S. Scott
*Assistant Examiner* — Miraj T. Patel
(74) *Attorney, Agent, or Firm* — Gregory P. Habiak; Charles R. Matson

(57) ABSTRACT

The present invention relates to a waste sorting process for separating used absorbent articles from a general waste stream, the process comprising the steps of: providing a packaged product comprising an outer package, a plurality of absorbent articles and a first disposal bag, wherein the plurality of absorbent articles and the first disposal bag are contained within the outer package, wherein the first disposal bag is used for disposal of the used absorbent articles into the general waste stream and the first disposal bag is subsequently recovered from the general waste stream for subsequent processing or recycling of the used absorbent articles.

9 Claims, 1 Drawing Sheet

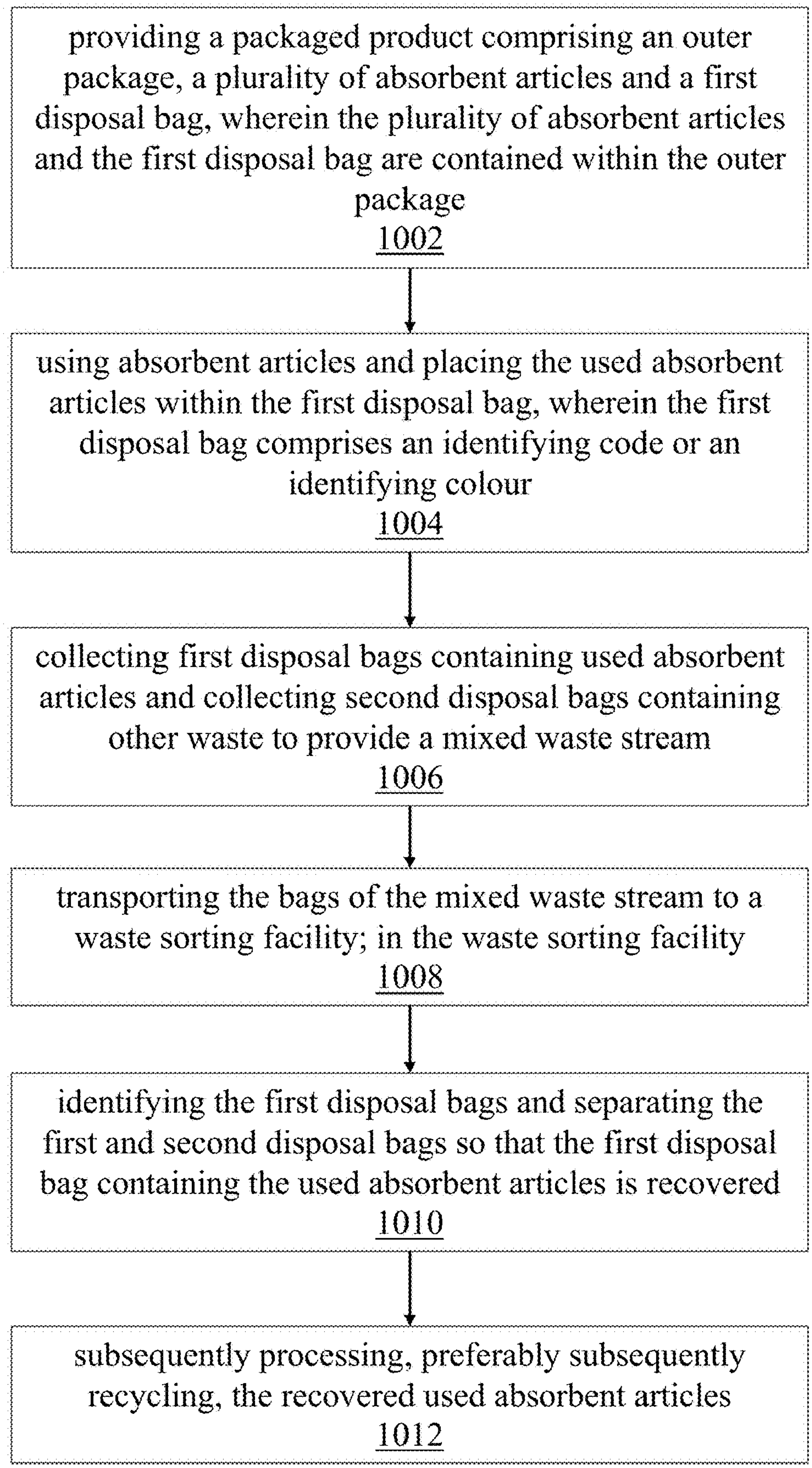
1000

WASTE SORTING AND SEPARATION PROCESS FOR ABSORBENT ARTICLES

CROSS-REFERENCE TO RELATED APPLICATIONS

This application is a continuation of PCT/US2022/036750, filed Jul. 12, 2022, which claims priority to European Patent Application No. 21185070.6, filed on Jul. 12, 2021, the entire disclosures of which are hereby incorporated by reference.

FIELD

The present invention relates to a waste sorting process for absorbent articles, such as diapers, pants, feminine hygiene articles, adult incontinence articles, wipes etc.

BACKGROUND

In the modern world there is an increasing urge to protect the environment by recycling used products, especially for more efficient recycling of single-use, disposable items. In many societies around the world, waste items are pre-sorted in the home or business into separate waste streams of, for example: paper, glass, plastic packaging, organic waste and residual, general waste. Typically each waste stream is collected separately from homes and businesses and transported to a waste sorting facility for further processing. Pre-sorting in this way enables more efficient recycling of various materials at the waste disposal facility which may reduce the need for putting waste into landfill or incinerating waste and at the same time this enables potentially valuable raw materials to be recovered and recycled.

However there are practical limits on the number of different waste streams that a household or small business can be expected to manage. One particular problem stems from disposal of absorbent products. One Malaysian study in 2016 found that diapers made up 12% of municipal solid waste. Various manufacturers are developing pilot-scale and commercial processes for recycling used absorbent articles, but in general these processes need a supply of used absorbent articles which is largely uncontaminated by other types of waste. Methods of efficiently separating used absorbent articles from general and other waste steams are still needed to improve recycling rates and to reduce landfill and incineration of this type of waste.

U.S. Pat. No. 5,100,005, issued on Mar. 31, 1992, discloses trash bags for recyclable articles and methods for collecting recyclable waste.

It would be desirable to provide methods of recovering used absorbent articles in a waste stream, already existing in the local waste collection infrastructure so that subsequent processing, including recycling, of such waste may be carried out, saving costs and complexity associated with separate collection approaches.

BRIEF DESCRIPTION OF THE DRAWINGS

FIG. 1 is an example flow chart configuration illustrating a waste sorting process.

SUMMARY

The present invention relates to a waste sorting process for separating used absorbent articles from a general waste stream, the process comprising the steps of: providing a packaged product comprising an outer package, a plurality of absorbent articles and a first disposal bag, wherein the plurality of absorbent articles and the first disposal bag are contained within the outer package; using absorbent articles and placing the used absorbent articles within the first disposal bag, wherein the first disposal bag comprises an identifying code or an identifying colour;

collecting first disposal bags containing used absorbent articles and collecting second disposal bags containing other waste to provide a mixed waste stream; and transporting the bags of the mixed waste stream to a waste sorting facility; in the waste sorting facility, identifying the first disposal bags and separating the first and second disposal bags so that the first disposal bag containing the used absorbent articles is recovered; subsequently processing, preferably subsequently recycling, the recovered used absorbent articles.

DETAILED DESCRIPTION

"Absorbent article" refers to devices that absorb and contain body exudates, particularly urine and other water-containing liquids, and, more specifically, refers to devices that are placed against or in proximity to the body of the wearer to absorb and contain the various exudates discharged from the body. Absorbent articles may include diapers (diapers for babies and infants and diapers to address adult incontinence), pants (pants for babies and infants and pants to address adult incontinence), disposable absorbent inserts for diapers and pants having a re-usable outer cover), feminine care absorbent articles such as sanitary napkins or pantiliners, breast pads, care mats, bibs, wipes, and the like. As used herein, the term "exudates" includes, but is not limited to, urine, blood, vaginal discharges, breast milk, sweat and fecal matter. Preferred absorbent articles of the present invention are disposable absorbent articles, more preferably disposable diapers, disposable pants and disposable absorbent inserts.

"Disposable" is used in its ordinary sense to mean an article that is disposed or discarded after a limited number of usage events over varying lengths of time, for example, less than 10 events, less than 5 events, or less than 2 events. If the disposable absorbent article is a diaper, a pant, absorbent insert, sanitary napkin, sanitary pad, wipe for surface cleaning or wet wipe for personal hygiene use, the disposable absorbent article is most often intended to be disposed after single use.

"Diaper" and "pant" refers to an absorbent article generally worn by babies, infants and incontinent persons about the lower torso so as to encircle the waist and legs of the wearer and that is specifically adapted to receive and contain urinary and fecal waste. In a pant, as used herein, the longitudinal edges of the first and second waist region are attached to each other to a pre-form waist opening and leg openings. A pant is placed in position on the wearer by inserting the wearer's legs into the leg openings and sliding the pant absorbent article into position about the wearer's lower torso. A pant may be pre-formed by any suitable technique including, but not limited to, joining together portions of the absorbent article using refastenable and/or non-refastenable bonds (e.g., seam, weld, adhesive, cohesive bond, fastener, etc.). A pant may be pre-formed anywhere along the circumference of the article (e.g., side fastened, front waist fastened). In a diaper, the waist opening and leg openings are only formed when the diaper is applied onto a wearer by (releasable) attaching the longitudinal edges of the first and second waist region to each other on both sides by a suitable fastening system.

Systems and methods for sorting waste are typically carried out by, or on behalf of, municipal authorities so that household, business and other waste is disposed of efficiently and to minimize pollution of the environment. In such waste sorting systems, waste items are transported on conveyor belts and diverted into different waste streams, for example by arms which may be operated hydraulically or pneumatically, or by other means; by air jets which may be provided by compressed air nozzles; by vacuum; by magnets; by sieves and vibrating screens; and by other methods. For example, waste sorting systems are described in WO 2019/211267, published on Nov. 7, 2019, assigned to Envac Optibag AB. The system discloses at least two waste containers, the waste containers being provided with at least one means of identification for one fraction of waste contained within one of the waste bags. Sensors in the waste sorting facility identify the waste and the system sorts the waste into different waste streams.

According to the present invention the operation of existing waste sorting systems is facilitated by providing the consumer who may use the absorbent products, or who may be the parent or care-provider for another user, a baby or young infant for example, with a readily available method of disposing of used absorbent products in such a way that the used absorbent items can readily be separated from other waste items in the waste sorting system. This is achieved by providing a packaged product comprising plurality of absorbent articles and a first disposal bag wherein the first disposal bag comprises an identifying code or an identifying colour which is then used to identify and sort the waste in the waste sorting system.

The packaged product comprises an outer package which largely or completely surrounds and protects the absorbent articles during storage, shipping and distribution until it reaches the consumer, at which point the packaging will be opened to access the contents. An outer package may be a film wrap or paper wrap. Alternatively, the outer package may be a cardboard box or the like. According to the present invention the packaged product comprises the plurality of absorbent articles and the first disposal bag. The absorbent articles and the first disposal bag are contained within the outer package. Consequently the user always has the disposal bag available at the point of use of the absorbent articles which facilitates the pre-sorting of the absorbent articles.

The first disposal bag comprises a film which is preferably strong enough to resist tears and reduce likelihood of breakage during collection, transportation and discharge to the waste sorting facility. The first disposal bag is preferably also flexible enough to be able to enclose the waste even when the containers are compressed, for example in the garbage truck.

The first disposal bag comprises a film having a Breaking Factor of preferably more than 400 N/m, more preferably more than 500 N/m, measured according to ASTM D882-18 described in more detail below.

Recycling may be facilitated if the first disposal bag is made from a film material which is similar in terms of chemical structure to the largest component of nonwoven or film materials that make up the absorbent articles. Conventionally such nonwoven or film materials are largely made out of polypropylene and polyethylene. Therefore it is preferred that the first disposal bag is made from a film material comprising at least 90% by weight of polypropylene and/or polyethylene. In a most preferred embodiment the first disposal bag is made from a film material comprising at least 90% by weight of polypropylene.

The first disposal bag preferably comprises a film having a thickness of more than 0.01 mm, more preferably more than 0.02 mm, even more preferably more than 0.04 mm. The first disposal bag preferably comprises a film having a thickness of less than 2 mm, more preferably less than 1 mm.

The first disposal bag may have a closure to prevent waste within the container from escaping or leaking from the bag. Alternatively the first disposal bag may be closed with a knot or a tape or other means used by the user once the first disposal bag has been filled with used absorbent products.

The first disposal bag has a volume which is sufficiently large to contain the used absorbent articles. Given that the volume of any used absorbent article is greater than the volume of the absorbent article before use, the volume of the first disposal bag, when fully opened, is preferably greater than the volume of the outer package. Preferably the volume of the first disposal bag is at least 3 times greater, and more preferably at least 5 times greater, than the volume of the outer package.

The first disposal bag comprises an identifying code or an identifying colour. A suitable identifying code may be a QR code, a RFID code, or a barcode. A suitable identifying colour may also a color shade or a color hue. The first disposal bag may also comprise a tactile mark. The first disposal bag may also be provided with a combination of two or more identifying features.

The identifying features may be applied to the special waste bag in multiple ways: it may be present throughout the material of the first disposal bag, or it may printed on the first disposal bag, or it may be printed on an adhesive sticker to stick on the first disposal bag, or on a tape to use to close the first disposal bag, or may be applied via any other means known in the art.

If colour is used as an identifying feature, the color may be a pure color, i.e. the color with the greatest saturation in each hue. Alternatively the color may be used as a shade, a tone or tint of that color, obtained from mixing that pure color with respectively black, grey or white. The color of the first disposal bag should not be black. Hue is one of the main properties of a color and can typically be represented quantitatively by a single number, often corresponding to an angular position around a central or neutral point or axis on a color space coordinate diagram (such as a chromaticity diagram) or color wheel, or by its dominant wavelength or that of its complementary color. The other color appearance parameters are colorfulness, saturation (also known as intensity or chroma), lightness, and brightness.

The identifying feature can be analyzed using sensors such as optical cameras connected to computers, and the method and analysis can be completely automated, according to methods known in the art, such as described in EP 759816.

The first disposal bag may be transparent, but it may also be provided with a color or shade, which may still allow the bag to be transparent, i.e. have a low opacity in the visible light spectrum. Alternatively the first disposal bag can be completely colored, i.e. does not allow to see through. Preferably the first disposal bag is opaque to avoid interference of the used absorbent article color with detection of the color or pattern of the first disposal bag. Opacity of the first disposal bag can be measured with the Opacity test method, further described below, and is preferably greater than 20% and more preferably 50% or greater.

The identifying feature of the first disposal bag may comprise RFID in the form of an RFID tag or similar, which can be read based on radio frequencies. The RFID means may be bonded to or on directly the first disposal bag or the closure means for example, with glue or double-sided adhesive tape. Alternatively, the RFID means may be printed, entirely or partly, on the first disposal bag via polymer electronics or paper electronics. The RFID means can be used for coding how the first disposal bag should be sorted. Any methods known in the art with RFID may be used here, for example as described in EP1855964. Such RDIF tag may consist of a chip and an antenna coil. The chip may further comprise a processor and a data memory. The RFID tags may be active and passive, the active RFID tag is endowed with a power source while the passive RFID tag is able to receive energy from a magnetic field that induces a current in the antenna coil, which activates the chip. When the chip is activated, the processor retrieves information from the data memory and sends a response signal corresponding to said information via the antenna coil, wherein such information could be waste management billing information, contents of the disposal bag, information of the household or entity who disposed the first disposal bag, etc.

The key parts of the RDIF tag, i.e. the antenna coil and the chip, may be arranged directly on or in the first disposal bag, or on/in the material from which it is made.

The identifying feature of the first disposal bag may comprise a barcode. A barcode is a method of representing data in a visual, machine-readable form. A barcode is a machine-readable optical label that contains one or more information and/or data about the item to which it is attached. Barcodes may be linear or one-dimensional (1D), representing data by varying the widths and spacings of parallel lines. These 1D barcodes can be scanned by special optical scanners, called barcode readers, of which there are several types. Barcodes may be two-dimensional (2D), using rectangles, dots, hexagons and other patterns, called matrix codes or 2D barcodes. 2D barcodes can be read using purpose-built 2D optical scanners, which exist in a few different forms. 2D barcodes can also be read by a digital camera connected to a microcomputer running software that takes a photographic image of the barcode and analyzes the image to deconstruct and decode the 2D barcode. A mobile device with an inbuilt camera, such as smartphone, can function as the latter type of 2D barcode reader using specialized application software.

The identifying feature of the first disposal bag may comprise a QR code. A QR code (abbreviated from Quick Response code) is a type of matrix barcode, or two-dimensional barcode. A QR code may use any of the four standardized encoding modes (numeric, alphanumeric, byte/binary, and kanji) to store data efficiently and extensions may also be used. QR code may follow existing standard, such as ISO/IEC 18004:2015. The QR code may be read in the waste treatment plant by a QR reader; the QR reader may be an imaging device such as a camera, which acquires the image of the QR code and processes it according to the standards, such as ISO/IEC 18004:2015, so that the QR code can be appropriately interpreted. The identifying code may be a geometric pattern, e.g. a set of shapes, like triangles, squares, circles, etc, repeating in a regular and predictable manner. Alternatively, the identifying code of the first disposal bag may be a digital watermark, carrying digital information within a pattern or image in a way to be imperceptible to the human eye.

The first disposal bag containing used absorbent products, may be disposed in the mixed residual waste bin. The mixed residual waste bin is used to collect the general waste from the household, all that can not be disposed of in other source separated waste streams such as the organic waste container, the plastic waste container, the paper waste container, etc.

Alternatively the first disposal bag, containing used absorbent products, may be disposed in an organic waste container. In this case the absorbent products are preferably biodegradable and the first disposal bag is preferably biodegradable.

Alternatively the first disposal bag, containing used absorbent products, may be disposed in mixed plastic waste container. In this case it may be advantageous for the waste operator to process the mixed plastic waste stream together with the first disposal bag. In fact the first disposal bag will reduce substantially the contamination of plastic items from the mixed plastic waste stream, wherein those plastic items are intended to be separated with the methods known in the art for later mechanical recycling, while the leftover plastic items, which can not be mechanically recycled and the first disposal bags, together with their absorbent product content, are sent to chemical recycling facilities.

Optionally, the waste sorting process further comprises the step of recycling the used absorbent articles by a recycling process selected from: mechanical separation and recovery of at least some of the materials of the used absorbent articles; or composting of the used absorbent articles; or mechanical-biological treatments, which combine mechanical and biological means to treat waste; or thermal decomposition, for example pyrolysis, of the used absorbent articles. Preferably the waste sorting process further comprises the step of mechanically separating the used absorbent articles into at least two material streams: a first material stream comprising cellulosic materials and a separate, second material stream comprising thermoplastic materials.

Test Methods

Breaking Factor Test Method

The first disposal bag comprises a film. The physical properties of the film may be characterized by reference to ASTM D882-18. This standard may be used to determine the average Breaking Factor of the film.

Test samples are cut from the first disposal bag, taking care to not impart any contamination or distortion to the test sample during the process. If the first disposal bag is folded, the first disposal bag is first unfolded to make sure that a single layer is cut from the first disposal bag as test sample. Each test sample is cut along the cross direction (CD), which is the direction parallel to opening edge of the first disposal bag, wherein the opening edge is defined as the edge from which the waste is inserted in the first disposal bag. For the test an initial grip separation of 50 mm is used, rate of grip separation of 500 mm/min and initial strain rate of 10 mm/(mm*min).

Opacity Test Method

Opacity measurements are made using a 45°/0° spectrophotometer with adjustable apertures capable of making standard CIE color measurements using XYZ coordinates and contrast ratio. An example of a suitable spectrophotometer is the Hunter ColorFlex EZ Spectrophotometer (available from HunterLab, Inc., Reston, VA, or equivalent). Measurements are conducted on a single layer of test sample. All testing is performed in a room maintained at a temperature of 23° C.±2.0° C. and a relative humidity of 50%±2% and test samples are conditioned under the same environmental conditions for at least 2 hours prior to testing.

A test sample, a square of dimensions 10.16 cm by 10.16 cm, is cut from the first disposal bag, taking care to not impart any contamination or distortion to the test sample during the process. If the first disposal bag is folded, the first disposal bag is first unfolded to make sure that a single layer is cut from the first disposal bag as test sample. The test sample is obtained from a non printed area of the first disposal bag, free of folds or wrinkles, and it must be larger than the aperture being used on the spectrophotometer, the aperture has a diameter of at least 25.4 mm (1 inch). The outer side of the first disposal bag is noted and is placed facing the aperture during the measurement. A sufficient quantity of the test sample is obtained such that ten measurements can be made on non-overlapping areas of the first disposal bag being evaluated.

To measure Opacity, the instrument is calibrated and standardized per the vendor instructions using the standard white and black tiles provided by the vendor with a given port aperture in place, which must be smaller than the test sample size. The spectrophotometer is set to use the CIE XYZ color space with a D65 standard illumination, a 10° observer, a specific port aperture size. The outer facing side of the test sample is placed facing the aperture, ensuring that the entire aperture opening is covered by the sample.

The standard white tile is placed directly against the back side of the test sample, a reading is taken and the Y value is recorded as $Y_{white\ backing}$ to the nearest 0.1 units. Without moving the position of the test sample, the standard white tile is removed and replaced with the black standard tile. A reading is taken and the Y value is recorded as $Y_{black\ backing}$ to the nearest 0.1 units. Opacity is calculated by dividing the $Y_{black\ backing}$ value by the $Y_{white\ backing}$ value and then multiplying by 100%. Opacity is recorded to the nearest 0.1 percent.

In like fashion, the measurement is repeated for a total of five measurements on non-overlapping areas of the test sample(s). The arithmetic mean of the five opacity measurements is calculated and is reported to the nearest 0.1 percent, as Opacity of the first disposal bag.

FIG. 1 is an example flow chart configuration illustrating a waste sorting process 1000 for separating used absorbent articles from a general waste stream, the process comprising the steps of: 1002 providing a packaged product comprising an outer package, a plurality of absorbent articles and a first disposal bag, wherein the plurality of absorbent articles and the first disposal bag are contained within the outer package; 1004 using absorbent articles and placing the used absorbent articles within the first disposal bag, wherein the first disposal bag comprises an identifying code or an identifying colour; 1006 collecting first disposal bags containing used absorbent articles and collecting second disposal bags containing other waste to provide a mixed waste stream; and 1008 transporting the bags of the mixed waste stream to a waste sorting facility; in the waste sorting facility, 1010 identifying the first disposal bags and separating the first and second disposal bags so that the first disposal bag containing the used absorbent articles is recovered; 1012 subsequently processing, preferably subsequently recycling, the recovered used absorbent articles.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. A waste sorting process for separating used absorbent articles from a general waste stream, the process comprising steps of:

providing a packaged product comprising an outer package, a plurality of absorbent articles and a first disposal bag, wherein the plurality of absorbent articles and the first disposal bag are contained within the outer package;

using absorbent articles and placing the used absorbent articles within the first disposal bag, wherein the first disposal bag comprises an identifying code or an identifying colour;

collecting first disposal bags containing used absorbent articles and collecting second disposal bags containing other waste to provide a mixed waste stream; and transporting the bags of the mixed waste stream to a waste sorting facility;

in the waste sorting facility, identifying the first disposal bags and separating the first from the second disposal bags so that the first disposal bag containing the used absorbent articles is recovered;

recycling the used absorbent articles by a recycling process selected from: mechanical separation and recovery of at least some of the materials of the used absorbent articles; or composting of the used absorbent articles; or mechanical-biological treatment; or thermal decomposition of the used absorbent articles; or combinations of the above; and mechanically separating the used absorbent articles into at least two material streams: a first material stream comprising cellulosic materials and a separate, second material stream comprising thermoplastic materials.

2. The waste sorting process according to claim 1, wherein the process comprises a step of subsequently processing the used absorbent articles.

3. The waste sorting process according to claim 1, wherein the first disposal bag comprises an identifying code selected from the group consisting of: a QR code, a RFID code, or a barcode.

4. The waste sorting process according to claim 1, further comprising a step of placing the first disposal bag within the second disposal bag before the step of collecting the first and second disposal bags.

5. The waste sorting process according to claim 1, wherein the second disposal bag further contains waste from the group consisting of: organic waste; or plastic waste; or residual waste; or mixed waste.

6. A waste sorting process for separating used absorbent articles from a general waste stream, the process comprising steps of:

providing a packaged product comprising an outer package, a plurality of absorbent articles and a first disposal bag, wherein the plurality of absorbent articles and the first disposal bag are contained within the outer package;

using absorbent articles and placing the used absorbent articles within the first disposal bag, wherein the first disposal bag comprises an identifying code or an identifying colour;

collecting first disposal bags containing used absorbent articles and collecting second disposal bags containing other waste to provide a mixed waste stream; and transporting the bags of the mixed waste stream to a waste sorting facility;

in the waste sorting facility, identifying the first disposal bags and separating the first from the second disposal bags so that the first disposal bag containing the used absorbent articles is recovered;

recycling the used absorbent articles by a recycling process selected from: mechanical separation and recovery of at least some of the materials of the used absorbent articles; or composting of the used absorbent articles;

or mechanical-biological treatment; or thermal decomposition of the used absorbent articles; or combinations of the above; and mechanically separating the used absorbent articles into at least two material streams: a first material stream comprising cellulosic materials and a separate, second material stream comprising thermoplastic materials.

7. The waste sorting process according to claim 6, wherein the first disposal bag comprises an identifying code selected from the group consisting of: a QR code, a RFID code, or a barcode.

8. The waste sorting process according to claim 6 further comprising the step of placing the first disposal bag within the second disposal bag before the step of collecting the first and second disposal bags.

9. The waste sorting process according to claim 6, wherein the second disposal bag further contains waste from the group consisting of: organic waste; or plastic waste; or residual waste; or mixed waste.

* * * * *